United States Patent

Ishiguro et al.

[11] Patent Number: 6,062,038
[45] Date of Patent: May 16, 2000

[54] ABSORPTION REFRIGERATING MACHINE

[75] Inventors: Katsusuke Ishiguro; Akira Maruyama; Hiroshi Kamiya, all of Nagoya, Japan

[73] Assignee: Paloma Industries, Limited, Aichi-Ken, Japan

[21] Appl. No.: 09/220,478

[22] Filed: Dec. 23, 1998

[30] Foreign Application Priority Data

Jun. 10, 1998 [JP] Japan ................................. 10-179595

[51] Int. Cl.[7] .................................................. F25B 15/00
[52] U.S. Cl. .................................. 62/476; 62/141; 62/105
[58] Field of Search ............................. 62/141, 476, 105

[56] References Cited

U.S. PATENT DOCUMENTS

| | | | |
|---|---|---|---|
| 3,695,053 | 10/1972 | Griffin | 62/103 |
| 4,348,868 | 9/1982 | Foster et al. | 62/101 |
| 4,493,192 | 1/1985 | Hibino et al. | 62/141 |
| 4,534,180 | 8/1985 | Yasuda et al. | 62/141 |
| 4,718,243 | 1/1988 | Buschulte et al. | 62/101 |
| 4,791,790 | 12/1988 | Tongu | 62/476 |
| 4,872,319 | 10/1989 | Tongu | 62/141 |
| 5,271,246 | 12/1993 | Yamauchi | 62/476 |
| 5,477,696 | 12/1995 | Takahata et al. | 62/148 |
| 5,617,733 | 4/1997 | Tomita et al. | 62/324.2 |
| 5,794,456 | 8/1998 | Ishiguro et al. | 62/497 |
| 5,819,553 | 10/1998 | Ishiguro | 62/495 |
| 5,857,354 | 1/1999 | Ishiguro | 62/476 |
| 5,934,090 | 8/1999 | Ozu et al. | 62/141 |

*Primary Examiner*—William Doerrler
*Assistant Examiner*—Mark Shulman
*Attorney, Agent, or Firm*—Pearson & Pearson

[57] ABSTRACT

Whenever necessary, an operation for diluting an absorbing solution after the stop of the operation is unlimitedly enabled without increasing the size of an absorption refrigerating machine. For the dilution operation after the operation of the absorption refrigerating machine, a pipe line of a dilute solution circulating pipe KD is opened by a dilution valve VD. Thereby, a solution pump P1 and an absorber A can be directly connected through a circulating pipe K6. The operation of the solution pump allows circulating a low-concentration solution and facilitates the dilution of a high-concentration solution to a low concentration. Since this case has nothing to do with a pressure difference in a path, the dilution operation can be performed whenever necessary. Moreover, since it is unnecessary to deal with a pressure loss, it is not necessary to increase the height of the apparatus. Thus, there are no increase in the space for installation and no rise in the cost of the apparatus due to the large-sized refrigerating machine. Moreover, since the solution pump used in the normal operation can be used for the dilution operation, an additional pump for the dilution operation only is not needed. The dilution operation can be therefore performed at low cost.

1 Claim, 3 Drawing Sheets

ABSORPTION REFRIGERATING MACHINE

BACKGROUND OF THE INVENTION

1. Field of the Invention

The present invention relates to an absorption refrigerating machine, used as an outdoor equipment of an absorption air conditioner, for cooling a heating medium for use in a cooling operation of an indoor air conditioner body.

2. Description of the Related Art

An absorption refrigerating machine has been heretofore known as the one applied to an absorption air conditioner disclosed in Japanese Patent Application Laid-open No. 10-26437, for example. In this absorption refrigerating machine, water is used as refrigerant and lithium bromide is used as absorbent. As shown in FIG. 3, this machine comprises: a high-temperature regenerator 110 having a fin-tube heat exchanger 112 for heating, by a heat of combustion of a burner 111, a lithium bromide aqueous solution (hereinafter simply referred to as a low-concentration solution, an intermediate-concentration solution and a high-concentration solution in accordance with the concentration of the lithium bromide) that is a low-concentration absorbing solution supplied from a solution pump 150; a high-temperature regenerator vapor-liquid separator 113 (hereinafter simply referred to as a high-temperature separator) for separating the low-concentration solution heated by the high-temperature regenerator 110 into a water vapor and the intermediate-concentration solution; a low-temperature regenerator 120 for heating the intermediate-concentration solution fed to a fin-tube heat exchanger 121 by the water vapor resulting from the separation performed by the high-temperature separator 113; a low-temperature regenerator vapor-liquid separator 122 (hereinafter simply referred to as a low-temperature separator) for separating the heated intermediate-concentration solution into the water vapor and the high-concentration solution; a condenser 130 for cooling and liquefying the water vapor from the low-temperature separator 122; an evaporator 141 for evaporating the water condensed by the condenser 130 and the low-temperature regenerator 120; and an absorber 142 for absorbing the water vapor from the evaporator 141 by the high-concentration solution.

The evaporator 141 and the absorber 142 are integrated into an evaporating/absorbing chamber 143. The chamber 143 is formed between a cold water pipe 160 and an outer pipe 140. The cold water pipe 160 has a double-pipe structure comprising the outer pipe 140 disposed coaxially outside the cold water pipe 160 extending from an indoor cooling machine (not shown). A solution circuit K from the absorber 142 to the high-temperature regenerator 110 includes the above-described solution pump 150 for circulating and supplying the low-concentration solution to the high-temperature regenerator 110; a low-temperature heat exchanger 151 for heat-exchanging the high-concentration solution fed from the low-temperature separator 122; and a high-temperature heat exchanger 152 for heat-exchanging the intermediate-concentration solution fed from the high-temperature separator 113. Also, the solution circuit from the high-temperature heat exchanger 152 to the low-temperature regenerator 120 includes a pressure reducing valve 114.

Next, the cooling operation of this absorption air conditioner will be described. The solution pump 150 starts operating. By the ignition of the burner 111, the low-concentration solution flowing through the fin-tube heat exchanger of the high-temperature regenerator 110 is heated, and thus the water vapor is generated. The heated low-concentration solution is then separated into the water vapor and the intermediate-concentration solution by the high-temperature separator 113. The intermediate-concentration solution is reduced in temperature by the high-temperature heat exchanger 152. Then, the intermediate-concentration solution is supplied to the low-temperature regenerator 120. When the intermediate-concentration solution flows through the fin-tube heat exchanger, it is reheated by the water vapor from the high-temperature separator 113. The intermediate-concentration solution is separated into the water vapor and the high-concentration solution by the low-temperature separator 122. The high-concentration solution is reduced in temperature by the low-temperature heat exchanger 151. Then, the high-concentration solution is dropped to an inner surface of the outer pipe 140. Meanwhile, the water vapor is cooled and condensed by the condenser 130. The water vapor is then dropped to an outer surface of the cold water pipe 160 of the evaporating/absorbing chamber 143. The dropped water is evaporated due to a low pressure in the evaporating/absorbing chamber 143. The heat equivalent to vaporizing heat is removed from the water flowing through the cold water pipe 160, and thus the water is cooled. Thereby, the cold water circulating through the cold water pipe 160 is led to an indoor equipment. Thus, the cooling operation is performed. The high-concentration solution absorbs the evaporated water vapor, so that it is changed into the low-concentration solution. The low-concentration solution passes through the low-temperature heat exchanger 151 and the high-temperature heat exchanger 152 by the solution pump 150, and thus its temperature is raised. Then, the low-concentration solution is fed to the high-temperature regenerator 110.

In the above-mentioned absorption refrigerating machine, after the stop of the operation, the high-concentration solution remains from the low-temperature separator 122 to a distal end of the absorber 142, more particularly. Thus, the lithium bromide is crystallized due to the drop in an outdoor air temperature or a solution temperature. As a result, the inside of the machine may be clogged with the crystallized lithium bromide. The prevention of such crystallization of the lithium bromide requires a dilution operation for circulating the low-concentration solution through a flow path which the lithium bromide aqueous solution flows through. The circulation of the low-concentration solution needs a pressure difference within the path. Desirably, the dilution operation is thus performed just after the stop of the operation. However, the dilution operation just after the operation causes a problem. That is, when the operation is restarted, it takes a long time to recover a steady operation condition where, within the path, the solution is located in accordance with a predetermined concentration profile and a predetermined pressure difference is made.

On the other hand, the low-concentration solution can be circulated by its own weight so as to perform the dilution operation. However, in this case, the absorption refrigerating machine is made higher so as to thereby overcome a pressure loss caused due to a restriction or the like in the path. Otherwise, the lithium bromide aqueous solution flows into a gas passage. Consequently, the refrigerating machine could not function. It is thus necessary to increase the size of the whole refrigerating machine by making the refrigerating machine higher. However, the trouble in installation is caused due to the increase in a space in which the refrigerating machine is installed. Also, the price goes up due to the increase in the size of the refrigerating machine.

The present invention is intended to solve the above problems. An object of the present invention is to provide an absorption refrigerating machine which can carry out the operation for diluting an absorbing solution after the stop of the operation when necessary and can smoothly restart the operation and which does not involve increasing the size of an apparatus.

SUMMARY OF THE INVENTION

In order to achieve the above object, the invention according to claim 1 is characterized by an absorption refrigerating machine which comprises: a regenerating section for heating and separating an absorbing solution having a high ratio of refrigerant into an absorbing solution having a ratio of refrigerant lower than that of the absorbing solution and a refrigerant vapor; a cooling section for cooling a heating medium by evaporating a refrigerant solution obtained by liquefying the refrigerant vapor; an absorbing section for spraying the absorbing solution having the low ratio of refrigerant supplied from the regenerating section and for absorbing the refrigerant vapor evaporated by the cooling section; and a pump for feeding the absorbing solution having the high ratio of refrigerant resulting from the absorption of the refrigerant vapor by the absorbing section to the regenerating section, wherein the machine includes: a dilution flow path for providing a direct connection between an absorbing solution flow path on a downstream side of the pump and an absorbing solution supply path to the absorbing section; and opening/closing means for opening and closing the dilution flow path.

The invention of claim 1 is constituted as described above. Thus, for the dilution operation after the operation, the dilution flow path is opened by the opening/closing means, whereby the absorbing solution flow path on the downstream side of the pump can be directly connected to the absorbing solution supply path to the absorbing section. The operation of the pump allows the low-concentration solution to be circulated and thus enables the high-concentration solution to be easily diluted to the low concentration. Since this case has nothing to do with the pressure difference in the path, there is no need for the dilution operation immediately after the stop of the operation. When necessary, the dilution operation can be carried out. Since it is also unnecessary to deal with the pressure loss, it is not necessary to increase the height of the refrigerating machine.

DETAILED DESCRIPTION OF THE PREFERRED EMBODIMENTS

Figure 1:
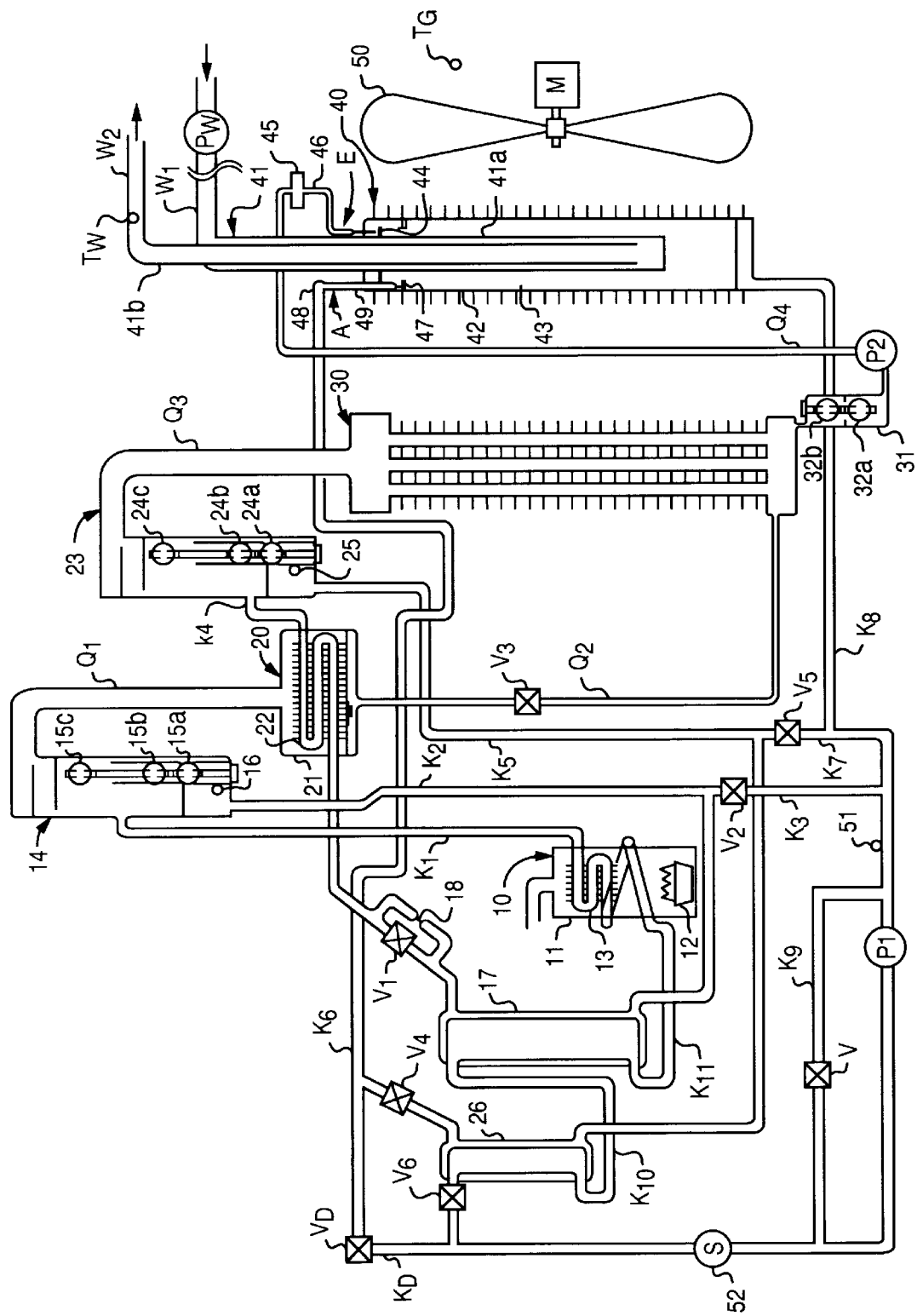
FIG. 1 schematically shows a constitution of an absorption refrigerating machine of an embodiment of the present invention.

An embodiment of the present invention will be described below with reference to the accompanying drawings. FIG. 1 shows a schematic constitution of an absorption refrigerating machine of this embodiment for cooling a heating medium in an indoor cooling apparatus.

This absorption refrigerating machine comprises basic elements: a high-temperature regenerator 10 for heating a low-concentration absorbing solution, a lithium bromide aqueous solution by a heat of combustion of a burner 12; a high-temperature separator 14 for separating the low-concentration solution heated by the high-temperature regenerator 10 into a water vapor and an intermediate-concentration solution; a low-temperature regenerator 20 for reheating the intermediate-concentration solution fed from the high-temperature separator 14 through a high-temperature heat exchanger 17 by the water vapor fed from the high-temperature separator 14; a low-temperature separator 23 for separating the intermediate-concentration solution heated by the low-temperature regenerator 20 into the water vapor and a high-concentration solution; a condenser 30 for cooling and liquefying the water vapor fed from the low-temperature separator 23; a double-pipe unit 40 for cooling the air-conditioning heating medium by evaporating the water fed from the condenser 30 and for absorbing the water vapor by the high-concentration solution fed from the low-temperature separator 23 through a low-temperature heat exchanger 26; a cooling fan 50 for cooling the double-pipe unit 40 and the condenser 30; and a solution pump P1 for feeding, from the double-pipe unit 40 to the high-temperature regenerator 10, the low-concentration solution whose temperature is raised by the heat exchange by the low-temperature heat exchanger 26 and the high-temperature heat exchanger 17. These elements are connected to one another by piping. The elements will be described in more detail below.

The high-temperature regenerator 10 is contained in a housing 11. The high-temperature regenerator 10 has a fin-tube heat exchanger 13 (hereinafter referred to as a heat exchanger) heated by the burner 12 so that the lithium bromide aqueous solution flowing through the tube can be efficiently heated. The high-temperature separator 14 is connected to the high-temperature regenerator 10 through a circulating pipe K1. The high-temperature separator 14 includes a lower limit float switch 15a for detecting the lower limit of a liquid level; an upper limit float switch 15b for detecting the upper limit of the liquid level; and a stop float switch 15c, disposed over the upper limit float switch 15b, for detecting a critical level. This stop float switch 15c is turned on, whereby the heating by the burner 12 is automatically stopped and thus the operation is stopped. In the high-temperature separator 14, included is a liquid temperature sensor 16 for sensing the temperature of the stored intermediate-concentration solution.

A circulating pipe K2 for circulating the solution from the high-temperature separator 14 is connected to a fin-tube heat exchanger 22 described below (hereinafter referred to as the heat exchanger) of the low-temperature regenerator 20 through the high-temperature heat exchanger 17. The high-temperature heat exchanger 17 is used so as to heat-exchange the high-temperature solution from the high-temperature separator 14 flowing outside (in the drawing) and the low-temperature low-concentration solution supplied from the aforementioned solution pump P1 and flowing inside (in the drawing). The circulating pipe K2 between the high-temperature heat exchanger 17 and the low-temperature regenerator 20 includes an orifice 18 and a float interlocking valve V1 in parallel. The orifice 18 is used so as to reduce the pressure of the solution passing therethrough, thereby keeping the liquid level in the high-temperature separator 14 at such a proper height that a liquid seal can be formed. The float interlocking valve V1 is a solenoid valve interlocked with the float switches 15a and 15b in the high-temperature separator 14. The float interlocking valve V1 is closed, when the liquid level of the intermediate-concentration solution in the high-temperature separator 14 reaches the lower limit and thus the lower limit float switch 15a is turned off. The float interlocking valve V1 is opened, when the liquid level reaches the upper limit and thus the upper limit float switch 15b is turned on.

On the upstream side of the high-temperature heat exchanger 17 (hereinafter, the side which the solution flows from is referred to as the upstream side, and the side which the solution flows toward is referred to as the downstream side), the circulating pipe K2 includes an overflow preventing pipe K3 branching from the circulating pipe K2 and joining a circulating pipe K8 described below. The overflow preventing pipe K3 includes an overflow valve V2 for opening and closing a pipe line. The opening of the overflow valve V2 allows eliminating the overflow state of the solution in the high-temperature separator 14.

The low-temperature regenerator 20 has the fin-tube heat exchanger 22 contained in a housing 21. A path for the water vapor from the high-temperature separator 14, i.e., a flow-through pipe Q1 is connected to the housing 21. The lithium bromide aqueous solution flowing through the heat exchanger 22 is heated by the water vapor supplied from the high-temperature separator 14 through the flow-through pipe Q1. Also, the water vapor is liquefied by the heat exchange with the lithium bromide aqueous solution. The resultant water is then reservoired in a bottom portion of the housing 21. In the bottom portion of the housing 21, included is a flow-through pipe Q2 for feeding the water reservoired in the housing 21 to the bottom portion of the condenser 30. To the flow-through pipe Q2, mounted is a valve V3 having an orifice function for making a pressure difference between the low-temperature regenerator 20 and the condenser 30.

The low-temperature separator 23 is connected to the downstream side of the heat exchanger 22 through a circulating pipe K4. The low-temperature separator 23 also includes a lower limit float switch 24a, an upper limit float switch 24b and a stop float switch 24c. The switches are used for controlling the liquid level. In the low-temperature separator 23, included is a liquid temperature sensor 25 for sensing the temperature of the stored high-concentration solution. The low-temperature heat exchanger 26 and a solenoid valve V4 for opening and closing the pipe line are sequentially mounted to a circulating pipe K5 for circulating the solution from the low-temperature separator 23. The circulating pipe K5 is joined to a circulating pipe K6 on the downstream side of the solenoid valve V4. The circulating pipe K5 is connected to an absorber A described below. The low-temperature heat exchanger 26 is used so as to heat-exchange the high-temperature solution from the low-temperature separator 23 flowing outside and the low-temperature low-concentration solution supplied from the aforementioned solution pump P1 and flowing inside.

On the upstream side of the low-temperature heat exchanger 26, the circulating pipe K5 includes an overflow preventing pipe K7 branching from the circulating pipe K5 and joining the circulating pipe K8 described below. The overflow preventing pipe K7 includes an overflow valve V5 for opening and closing the pipe line. The opening of the overflow valve V5 allows eliminating the overflow state of the solution in the low-temperature separator 23.

The condenser 30 comprises a plurality of vertically upright cylindrical pipes extending through a plurality of fins. The upper end of the condenser 30 is connected to the low-temperature separator 23 through a flow-through pipe Q3. The condenser 30 condenses the water vapor into the water by cooling the water vapor fed from the low-temperature separator 23 by air from the cooling fan 50. The water liquefied by the low-temperature regenerator 20 flows into the condenser 30 through the aforementioned flow-through pipe Q2 connected to the bottom portion of the condenser 30. This water is then joined to the water condensed in the condenser 30. A refrigerant tank 31 is connected to a lower portion of the condenser 30. The water condensed in the condenser 30 flows into and is temporarily stored in the refrigerant tank 31. The refrigerant tank 31 includes a lower limit float switch 32a for detecting the lower limit of the liquid level; and an upper limit float switch 32b for detecting the upper limit of the liquid level. A flow-through pipe Q4 extends from a lower end of the refrigerant tank 31. The refrigerant tank 31 is connected to an evaporator E described below through the flow-through pipe Q4. A refrigerant pump P2 is mounted to the flow-through pipe Q4. The liquid level in the refrigerant tank 31 reaches the upper limit and thus the upper limit float switch 32b is turned on, whereby the refrigerant pump P2 starts operating. The liquid level reaches the lower limit and thus the lower limit float switch 32a is turned off, whereby the refrigerant pump P2 stops operating. The refrigerant pump P2 prevents gas from mixing into the flow-through pipe Q4. Also, the refrigerant pump P2 controls the concentration all over the system.

The double-pipe unit 40 comprises a cold water pipe 41 which is a flow path for the heating medium for use in an indoor cooling machine (not shown); and an outer pipe 42 arranged coaxially in the outer periphery of the cold water pipe 41. The double-pipe unit 40 is mounted in a vertically upright position. The cold water pipe 41 is integrally connected to an inlet pipe W1 which the heating medium flows from the indoor cooling machine into. The cold water pipe 41 has a double-pipe structure comprising an evaporating pipe portion 41a whose lower end is sealed; and an inside pipe portion 41b which is coaxially arranged in the evaporating pipe portion 41a. The lower end of the inside pipe portion 41b is opened near the lower end of the evaporating pipe portion 41a. The upper end of the inside pipe portion 41b protrudes through the upper end of the evaporating pipe portion 41a. In this state, the inside pipe portion 41b is liquid-tightly secured to the evaporating pipe portion 41a. The distal end of the inside pipe portion 41b is integrally connected to an outlet pipe W2 from which the heating medium flows toward the indoor cooling machine. A cold water circulating pump PW is mounted to the inlet pipe W1. A water temperature sensor TW for sensing the temperature of the heating medium circulating through the pipe is disposed in the outlet pipe W2.

The upper and lower ends of the outer pipe 42 are sealed. Many fins 42a for cooling are coaxially mounted on an outer peripheral surface of the outer pipe 42. The above-described cold water pipe 41 extends through an upper end surface of the outer pipe 42, and the lower end thereof is located a predetermined distance apart from the lower end of the outer pipe 42. In this state, the cold water pipe 41 is liquid-tightly secured on the upper end surface of the outer pipe 42. The double-pipe unit 40 is thus formed, so that an evaporating/absorbing chamber 43 is disposed between the evaporating pipe portion 41a and the outer pipe 42.

The evaporating pipe portion 41a of the cold water pipe 41 includes a circular water saucer 44 surrounding the outer peripheral surface of the evaporating pipe portion 41a near the upper end in the evaporating/absorbing chamber 43. In the inner periphery of the water saucer 44, disposed are a plurality of spray holes (not shown) for spraying the water along the evaporating pipe portion 41a. Over the water saucer 44, located is a water spray pipe 46 distributed through a distributor 45 disposed on the distal end of the aforementioned flow-through pipe Q4 extending from the refrigerant tank 31. The water spray pipe 46 extends through the upper surface of the outer pipe 42. The evaporator E comprises the water spray pipe 46, the water saucer 44 and the outer peripheral surface of the evaporating pipe portion 41a. A grooved pipe whose outer peripheral surface is crosswise grooved is used as the evaporating pipe portion 41a. This facilitates the penetration of the water into the outer peripheral surface so as to delay a dropping speed of the water and to facilitate the spread of the water. Thereby, the water flowing through the outer peripheral surface is efficiently evaporated.

On an inner peripheral surface of the outer pipe 42, a circular solution saucer 47 is disposed along the inner peripheral surface slightly below the water saucer 44. In the outer periphery of the solution saucer 47, disposed are a plurality of spray holes (not shown) for spraying the solution along the inner peripheral surface of the outer pipe 42. Over the solution saucer 47, located is a solution spray pipe 49 distributed through a distributor 48 disposed on the distal end of the above-mentioned extending circulating pipe K6. The solution spray pipe 49 extends through the upper surface of the outer pipe 42. The absorber A comprises the solution spray pipe 49, the solution saucer 47 and the inner peripheral surface of the outer pipe 42. The inner peripheral surface of the outer pipe 42 is also roughed by shot blasting or the like. This facilitates the penetration of the solution into the inner peripheral surface so as to delay the dropping speed of the solution and to facilitate the spread of the solution. A plate material such as a lath net may be disposed on the inner peripheral surface. Although not shown, a plurality of double-pipe units 40 are arranged in parallel in accordance with the water spray pipe 46 distributed by the distributor 45 and the solution spray pipe 49 distributed by the distributor 48.

The circulating pipe K8 defining a solution circuit for supplying the low-concentration solution to the high-temperature regenerator 10 extends from a bottom wall of the double-pipe unit 40. The solution pump P1 is disposed midway along the circulating pipe K8. The above-described overflow preventing pipes K7 and K3 are sequentially joined to the upstream side of the solution pump P1 of the circulating pipe K8. The circulating pipe K8 includes a bypass pipe K9 so that the solution pump P1 may be bypassed. The bypass pipe K9 includes a bypass valve V so that a flow rate of the solution can be regulated. The circulating pipe K8 includes a liquid temperature sensor 51 for sensing the temperature of the solution. The liquid temperature sensor 51 is used for controlling a dilution operation, etc. A flow rate sensor 52 is mounted to the downstream side of the solution pump P1 of the circulating pipe K8. The flow rate sensor 52 is used for controlling the ignition of the burner 12 and for controlling a feed rate of gas fed to the burner 12 or the like by the flow rate of the low-concentration solution. A solenoid valve V6 for opening and closing the pipe line is also disposed near an inlet port of the low-temperature heat exchanger 26. A connection is provided through a circulating pipe K10 between the inner pipe of the low-temperature heat exchanger 26 and the inner pipe of the high-temperature heat exchanger 17. The inner pipe of the high-temperature heat exchanger 17 is connected to the heat exchanger 13 of the high-temperature regenerator 10 through a circulating pipe K11.

On the slightly upstream side of the solenoid valve V6 of the circulating pipe K8, disposed is a dilute solution circulating pipe KD branching from the circulating pipe K8 and joining the circulating pipe K6. Opening/closing means for opening and closing the pipe line, a dilution valve VD is mounted to the dilute solution circulating pipe KD. The dilution valve VD is opened, whereby the dilute solution circulating pipe KD can directly connect the circulating pipe K8 including the solution pump P1 to the absorber A through the circulating pipe K6.

Figure 2:
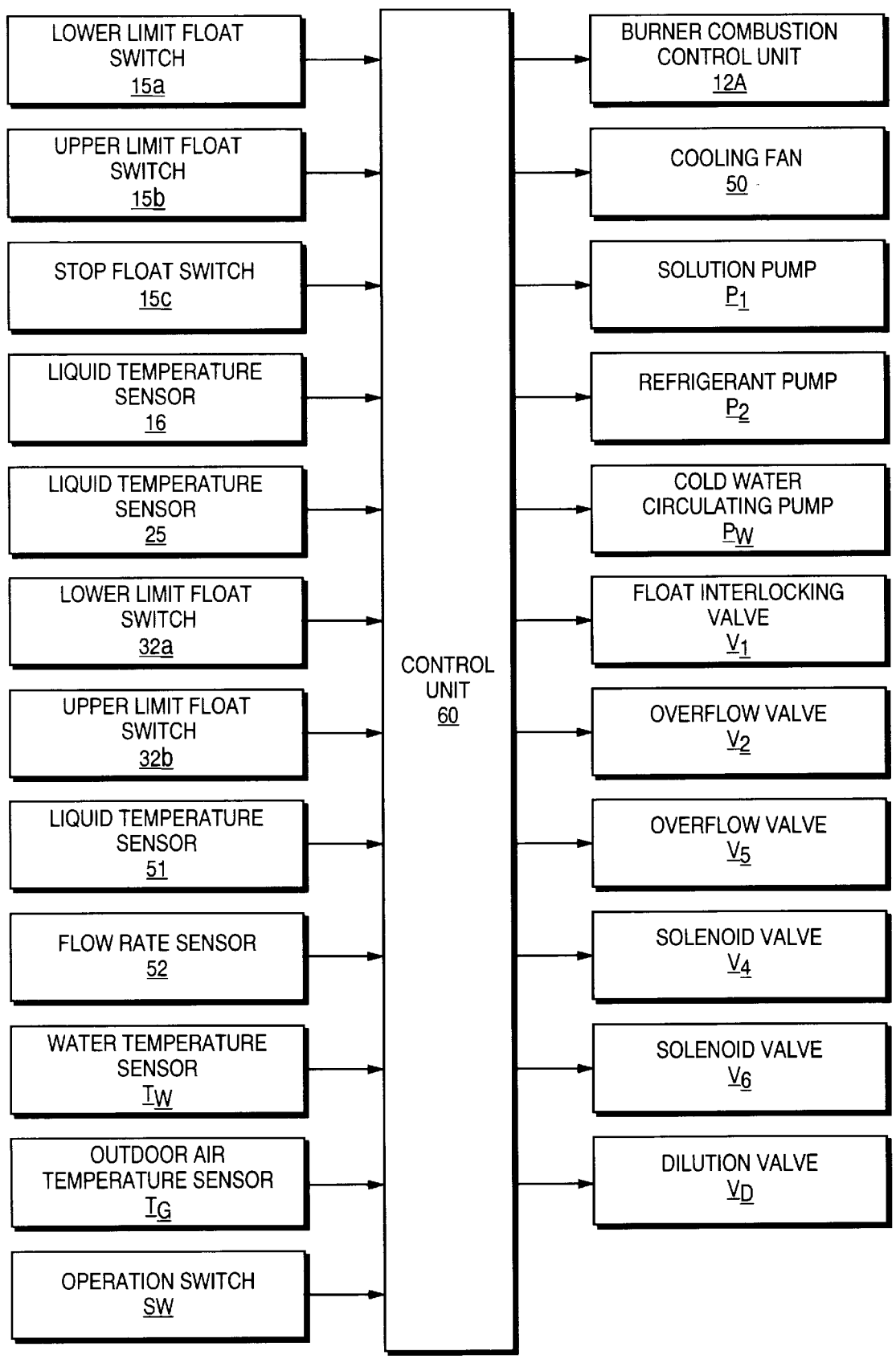
FIG. 2 is a block diagram showing a schematic circuit constitution of a control unit for controlling an electrical operation of the absorption refrigerating machine.
Figure 3:
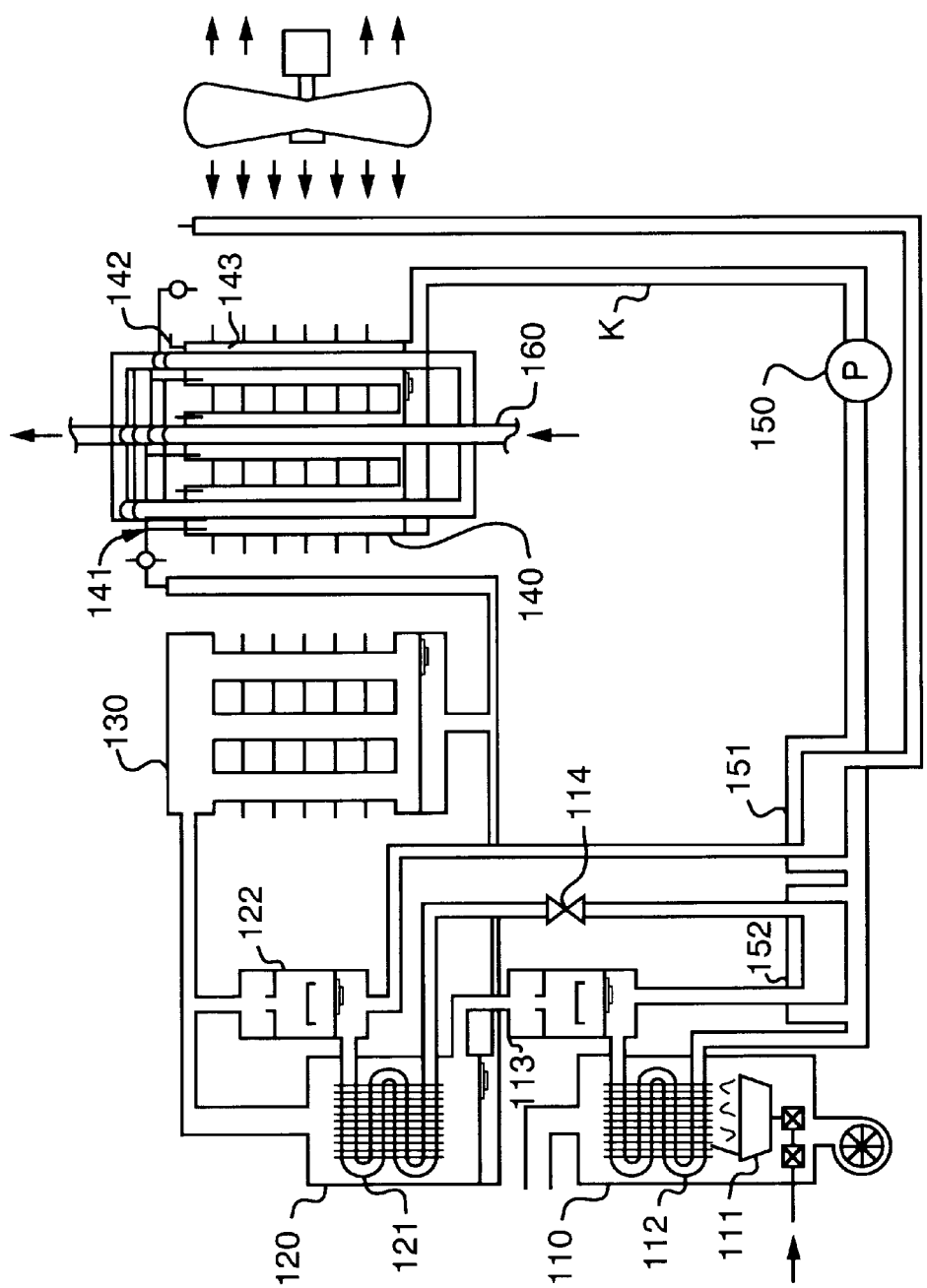
FIG. 3 schematically shows the constitution of an absorption air conditioner of the prior art.

Next, a control unit for electrically controlling the operation of the absorption refrigerating machine will be described. A control unit 60 comprises a microcomputer including CPU, ROM, RAM, a timer, I/O and the like, for example. The control unit 60 controls the circulation of the lithium bromide solution in the above-described elements so as to control the operation for cooling the heating medium in the double-pipe unit 40. As shown in FIG. 2, the lower limit float switch 15a, the upper limit float switch 15b, the stop float switch 15c, the liquid temperature sensor 16, the liquid temperature sensor 25, the lower limit float switch 32a, the upper limit float switch 32b, the liquid temperature sensor 51 and the flow rate sensor 52 are connected to an input of the control unit 60. An outdoor air temperature sensor TG for sensing the outdoor air temperature, the water temperature sensor TW for sensing the water temperature and an operation switch SW are also connected to the input of the control unit 60. The float interlocking valve V1, the overflow valves V2 and V5, the solenoid valves V4 and V6, the dilution valve VD, the solution pump P1, the refrigerant pump P2, the cold water circulating pump PW, a burner combustion control unit 12A and the cooling fan 50 are connected to an output of the control unit 60.

The operation of the embodiment constituted as described above is classified into a normal operation for cooling the heating medium and a dilution operation for diluting the high-concentration solution during the stop of the normal operation. These operations will be described below.

(1) Normal operation

The operation switch SW of the indoor cooling machine is turned on, whereby the cold water circulating pump PW starts supplying the heating medium to the double-pipe unit 40. When a cold water temperature is a set temperature (for example, 7° C.) or less, the refrigerating machine is not operated. When the cold water temperature is the set temperature or more, the solenoid valves V4, V6 and the overflow valve V2 are opened and the solution pump P1 starts operating. When the flow of the solution is checked by the flow rate sensor 52, the burner 12 starts combusting and thus the low-concentration solution is heated. Thereby, the water is evaporated from the low-concentration lithium bromide solution heated by the high-temperature regenerator 10. This solution is separated into the water vapor and the intermediate-concentration solution by the high-temperature separator 14. Then, the solution circulates through the short path connecting the circulating pipes K1, K2, the overflow preventing pipe K3, the circulating pipes K8, K10 and K1, whereby the temperature of the solution is rapidly raised.

Then, when the liquid temperature sensor 16 senses that the liquid temperature in the high-temperature separator 14 reaches the set temperature (for example, 70° C.) or more, the overflow valve V2 is closed and the overflow valve V5 is opened. Thus, the intermediate-concentration solution in the high-temperature separator 14 is cooled by the high-temperature heat exchanger 17. After that, this solution is heated by the heat exchanger 22 of the low-temperature regenerator 20, so that it is separated into the water vapor and the high-concentration solution by the low-temperature separator 23. Then, the solution passes through the short path connecting the circulating pipes K1, K2, K4, K5, the overflow preventing pipe K7, the circulating pipes K8, K10 and K11, whereby the temperature of the solution is rapidly raised. The liquid level in the high-temperature separator 14 is controlled by the lower and upper limit float switches 15a, 15b and the float interlocking valve V1, so that the mixing of the water vapor and the solution is prevented.

When the liquid temperature sensor 25 senses that the liquid temperature in the low-temperature separator 23 reaches the set temperature (for example, 70° C.) or more, the overflow valve V5 is closed. Thereby, the high-concentration solution in the low-temperature separator 23 passes through the low-temperature heat exchanger 26 and thus it is cooled. The solution is distributed by the distributor 48 of the absorber A through the circulating pipes K5 and K6. The solution is dropped into the solution saucer 47 from the spray holes of the solution spray pipe 49. The solution flows downward along an inner wall of the outer pipe 42. Thus, the cooling fan 50 efficiently cools the heat which is generated when the heating medium, the water vapor is absorbed into the high-concentration solution.

On the other hand, the water vapor from the flow-through pipe Q3 of the low-temperature separator 23 is condensed and cooled by the condenser 30. The resulting water passes through the refrigerant tank 31 and is supplied to the distributor 45 of the evaporator E by the refrigerant pump P2. The water distributed by the distributor 45 is dropped into the water saucer 44 from the water spray pipe 46. The water flows downward along the outer peripheral surface of the evaporating pipe portion 41a from the spray holes of the water saucer 44. At this time, a low pressure is maintained in the evaporating/absorbing chamber 43. Due to this, the flowing water is evaporated. The evaporating pipe portion 41a is cooled by the heat of evaporation. The heating medium flowing into the evaporating pipe portion 41a is cooled. The heating medium is refluxed to the indoor cooling machine through the inside pipe portion 41b. This heating medium allows the cooling operation of the indoor cooling machine. Then, the evaporated water is absorbed into the high-concentration solution flowing downward along the inner wall of the outer pipe 42. Thereby, the high-concentration solution is diluted to the low concentration. The solution is discharged from the bottom portion of the outer pipe 42 to the circulating pipe K8. The above-described operation is continuously performed, whereby the heating medium circulating through the cold water pipe 41 is efficiently cooled and thus the cooling operation of the indoor cooling machine can be maintained.

The operation is stopped when a required capability is inferior to the set capability or by turning off the operation switch SW. The path for supplying the gas to the burner 12 is closed and the cooling fan 50 is stopped. Furthermore, the feed rate of the solution fed by the solution pump P1 is reduced under the control of the control unit 60. Then, when the liquid temperature in the low-temperature separator 23 reaches the set temperature or less, the solution pump P1 is stopped. The cold water circulating pump PW of the indoor cooling machine is also stopped. As a result, the operation of the absorption refrigerating machine is stopped.

(2) Dilution operation

After the stop of the operation, when the solution temperature in the circulating pipe K8 falls or the outdoor air temperature falls, the lithium bromide may be crystallized from the high-concentration solution in the path. At this time, it is necessary to prevent the crystallization by the dilution operation. In this case, the float interlocking valve V1 and the overflow valves V2, V5 are first opened under the control of the control unit 60. The machine is left as it is for a predetermined time. The intermediate-concentration and high-concentration solutions in the high-temperature separator 14 and the low-temperature separator 23 are discharged. Then, the dilution valve VD is opened and the solenoid valves V4 and V6 are closed, so that the solution pump P1 starts operating. Thereby, the circulating pipes K8 and K6 are directly coupled to each other through the dilute solution circulating pipe KD. The low-concentration solution in the circulating pipe K8 is fed to the solution spray pipe 49 of the absorber A without a differential pressure applied to the solution. The high-concentration solution in the circulating pipe K6 and the absorber A is discharged. This portion can be filled with the low-concentration solution. Thus, even if the temperature further falls, the crystallization of the lithium bromide from the high-concentration solution can be surely prevented. The dilution operation is terminated as described below. That is, after a predetermined time enough to discharge the intermediate-concentration solution and the high-concentration solution, the solution pump P1 is stopped. Then, the overflow valves V2 and V5 are closed, and the float interlocking valve V1 and the dilution valve VD are closed. In this manner, the dilution operation is terminated. Consequently, the refrigerating machine is returned to an initial condition.

As described above, in the absorption refrigerating machine of this embodiment, for the dilution operation after the stop of the operation, the pipe line of the dilute solution circulating pipe KD is opened by the dilution valve VD. Thereby, the solution pump P1 and the absorber A can be directly connected through the circulating pipe K6. The operation of the solution pump P1 can facilitate the circulation of the low-concentration solution and thus the dilution of the high-concentration solution. Since this case has nothing to do with the pressure difference in the path, there is no need for the dilution operation just after the operation. When necessary, the dilution operation can be carried out. Therefore, when the operation is restarted, the operation condition of the refrigerating machine can be restored to the steady operation condition for a short time. Moreover, since it is unnecessary to deal with the pressure loss, it is not necessary to increase the height of the apparatus. Therefore, the space for the refrigerating machine is not increased. The rise in cost due to the increase in the size of the apparatus does not exist.

Furthermore, a nozzle is formed on the distal end of the solution spray pipe 49. However, an effect is obtained. That is, the low-concentration solution is forced to be fed by the solution pump P1. This ensures the prevention of the high-concentration solution being incompletely removed from the nozzle and thus remaining therein due to a surface tension or the like. Moreover, during the normal operation, a power for circulating the solution during the dilution operation is obtained by the use of the solution pump P1 for feeding the low-concentration solution from the double-pipe unit 40 to the high-temperature regenerator 10. Thus, an additional pump for the dilution operation only is not required. Therefore, the dilution operation can be performed at low cost.

In this embodiment, there are provided the low-temperature regenerator 20 and the low-temperature separator 23 as well as the high-temperature regenerator 10 and the high-temperature separator 14. However, the low-temperature regenerator and the low-temperature separator can be eliminated. Moreover, the refrigerating machine of the above-described embodiment is not limited to this embodiment. For example, sensors other than the float switches may be used for detecting the liquid level. The constitution of the double-pipe unit may be changed. The evaporator may be separated from the absorber. Various changes can be made without departing from the scope of the invention.

According to the present invention, there is no need for the dilution operation just after the stop of the operation. When necessary, the dilution operation can be carried out. Therefore, when the operation is restarted, the operation condition can be restored to the steady operation condition for a short time. Moreover, since it is unnecessary to deal with the pressure loss, it is not necessary to increase the height of the apparatus. Accordingly, there are no increase in the space for installation and no rise in the cost of the apparatus due to the increase in the size of the refrigerating machine. Furthermore, during the normal operation, the power for circulating the solution during the dilution operation is obtained by the use of the pump for feeding the solution from the absorbing section to the regenerating section. Thus, an additional pump for the dilution operation only is not required. Therefore, the dilution operation can be performed at low cost.

What is claimed is:

1. An absorption refrigerating machine comprising:

a regenerating section for heating and separating an absorbing solution having a high ratio of refrigerant into an absorbing solution having a ratio of refrigerant lower than that of the absorbing solution and a refrigerant vapor;

a cooling section for cooling a heating medium by evaporating a refrigerant solution obtained by liquefying said refrigerant vapor;

an absorbing section for spraying the absorbing solution having the low ratio of refrigerant supplied from said regenerating section and for absorbing the refrigerant vapor evaporated by said cooling section; and a pump for feeding the absorbing solution having the high ratio of refrigerant resulting from the absorption of the refrigerant vapor by said absorbing section to said regenerating section, wherein said machine includes:

a dilution flow path for providing a direct connection between an absorbing solution flow path on a downstream side of said pump and an absorbing solution supply path to said absorbing section; and opening/closing means for opening and closing the dilution flow path.

* * * * *